(12) United States Patent
Saborowski

(10) Patent No.: US 8,813,104 B2
(45) Date of Patent: Aug. 19, 2014

(54) ACCESSING FUNCTION FROM DIFFERENT ADDRESSING BIT SYSTEM

(75) Inventor: Ralf Saborowski, Leichlingen (DE)

(73) Assignee: CA, Inc., Islandia, NY (US)

( * ) Notice: Subject to any disclaimer, the term of this patent is extended or adjusted under 35 U.S.C. 154(b) by 1105 days.

(21) Appl. No.: 11/958,178

(22) Filed: Dec. 17, 2007

(65) Prior Publication Data
US 2009/0158303 A1  Jun. 18, 2009

(51) Int. Cl.
*G06F 9/44* (2006.01)

(52) U.S. Cl.
USPC ............ 719/332; 719/319; 719/328; 719/331

(58) Field of Classification Search
None
See application file for complete search history.

(56) References Cited

U.S. PATENT DOCUMENTS

| | | | | |
|---|---|---|---|---|
| 5,802,367 A | * | 9/1998 | Held et al. | 719/332 |
| 5,956,483 A | * | 9/1999 | Grate et al. | 709/203 |
| 6,134,559 A | * | 10/2000 | Brumme et al. | 1/1 |
| 6,230,312 B1 | * | 5/2001 | Hunt | 717/108 |
| 6,298,391 B1 | * | 10/2001 | Kennedy et al. | 719/328 |
| 6,324,681 B1 | * | 11/2001 | Sebesta et al. | 717/102 |
| 6,564,377 B1 | * | 5/2003 | Jayasimha et al. | 717/174 |
| 7,363,377 B1 | * | 4/2008 | Alban et al. | 709/227 |
| 2002/0019972 A1 | * | 2/2002 | Grier et al. | 717/3 |
| 2002/0199035 A1 | * | 12/2002 | Christensen et al. | 709/330 |
| 2004/0194078 A1 | * | 9/2004 | Shen | 717/168 |
| 2007/0050487 A1 | * | 3/2007 | Pravat et al. | 709/223 |
| 2007/0234329 A1 | * | 10/2007 | Shepard et al. | 717/163 |
| 2008/0235238 A1 | * | 9/2008 | Jalobeanu et al. | 707/10 |

* cited by examiner

*Primary Examiner* — Hyung Sough
*Assistant Examiner* — Shih-Wei Kraft
(74) *Attorney, Agent, or Firm* — Schwegman, Lundberg & Woessner, P.A.

(57) ABSTRACT

A system and method of accessing functions includes running n-bit based code in an n-bit supporting system environment. An m-bit based provider object is instantiated in an m-bit hardware and operating system environment server. The provider object provides an interface between the n-bit based code and m-bit based server functions. m-bit based server functions are accessed from the n-bit based code via the m-bit based provider object.

17 Claims, 3 Drawing Sheets

ACCESSING FUNCTION FROM DIFFERENT ADDRESSING BIT SYSTEM

BACKGROUND

With the widespread availability of 64 bit hardware and operating systems, application vendors are moving toward providing 64 bit server applications to the exclusion of 32 bit server applications. Many legacy applications were written with 32 bit addressing for 32 bit hardware and operating systems. While many 64 bit hardware and operating systems may run the 32 bit applications, certain application settings and metrics might only be available through 64 bit APIs from 64 bit code.

SUMMARY

A method of accessing functions includes running n-bit based code in an n-bit or m-bit hardware and operating system environment. An m-bit system may also support an n-bit mode. An m-bit based provider object is instantiated in an m-bit hardware and operating system environment server, which may or may not be the same system running the n-bit based code. The provider object provides an interface between the n-bit based code and m-bit based server functions. m-bit based server functions are accessed from the n-bit based code via the m-bit based provider object.

In various embodiments, when the n-bit based code is running remotely from the m-bit based provider object, the n-bit based code may be running on n-bit based operating system and hardware, or may be running in an n-bit mode under an m-bit operating system and hardware, or may also run on an n-bit operating system on m-bit capable hardware.

In one embodiment, a system includes a provider that runs in an m-bit environment and exposes m-bit functionality of an application through m-bit based APIs to m-bit functions. The provider exposes such APIs to n-bit based agents via component object model (COM) interfaces.

In a further embodiment, a computer readable medium has instructions for causing a computer to implement a method of accessing functions. The method includes instantiating an m-bit based provider object in an m-bit hardware and operating system environment server, wherein the provider object provides an interface between the n-bit based code and m-bit based server functions. n-bit based method calls are received from an n-bit based agent. m-bit based server functions are accessed from the n-bit based agent via the m-bit based provider object.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

A method and system for managing m-bit applications from n-bit code is described. Functions in the m-bit applications are accessed by the n-bit code by use of COM mechanisms. Several embodiments and variations are described. Some embodiments allow reuse of existing 32 bit code with access to 64 bit extensions without having to port or test the existing code. Such reuse can help avoid interoperability issues with existing large infrastructure applications that may not be available as 64 bit applications.

Figure 1:
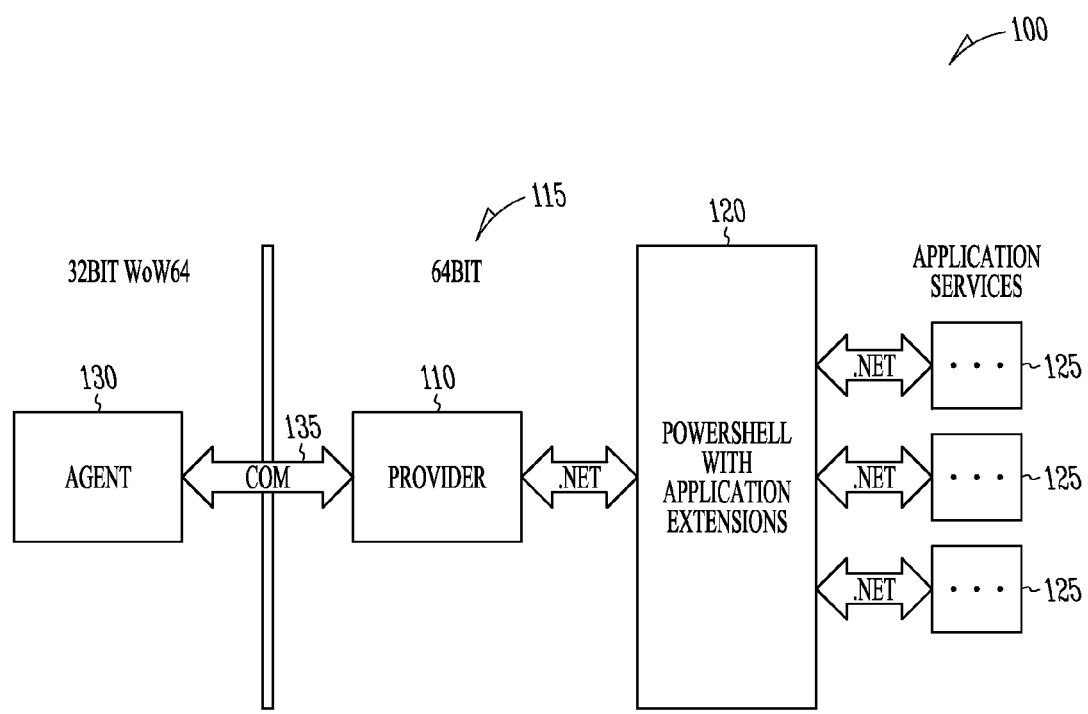
FIG. 1 is a block diagram of an architecture for accessing function from different addressing systems according to an example embodiment.

FIG. 1 illustrates an example architecture 100 for a system that includes a provider 110 that runs in an m-bit environment 115 and exposes m-bit functionality of an application 120 through m-bit based APIs to m-bit functions 125. In one embodiment, the provider 110 exposes such APIs to an n-bit based agent 130 via a COM interface 135.

In one embodiment, application 120 is a 64-bit Windows® Application exposing management and configuration interfaces through Microsoft Windows® PowerShell with application specific .NET extensions. An example for such an application is Microsoft® Exchange 2007.

Agent 130 in one embodiment is an application module running in isolated 32-bit WoW64 (Windows® on Windows® 64) mode for managing or monitoring an application running in 64 bit mode. Typically, agent 130, provider 110 and application 120 may be running on the same system, which supports both n and m-bit code, communicating via a COM interface 135. In a further embodiment, the application associated with agent 130 may be running on a client machine, while the 64-bit environment 115 may be a server communicating over a network or other communication medium via distributed component object model (DCOM) interface 135.

Access to application 120 management and configuration functionality is provided by provider 110, which may be a .NET application module running in 64-bit mode. The provider 110 exposes service APIs (application program interfaces) as COM interfaces and may be implemented as a standard .NET Interop assembly. These types of assemblies are inproc COM servers contained in dynamic link libraries (DLLs). Note that similar concepts may be used in other object based frameworks in further embodiments.

In order to gain access to the m-bit application management and configuration interface the assembly is registered as a local (out of proc) m-bit COM server. This can be achieved by means of DLL surrogation. DLL surrogation may be implemented by using the m-bit version of the operating system provided default DLL surrogation host (DLLHost.exe) or by implementing a custom DLL surrogation host, which may be written in C# in one embodiment.

In an alternative embodiment, the provider 110 exposes service APIs (application program interfaces) as COM interfaces 135 and may be implemented as a standalone m or 64-bit .NET application implementing a local COM out of proc server as an EXE.

Either implementation of the provider 110 may be installed and configured on a computer running the application 120. Provider 110 services can be accessed by an agent 130 running locally (that is on the computer running the application and the provider) by instantiating a server object through COM APIs or by an agent running remotely through DCOM APIs.

Figure 2:
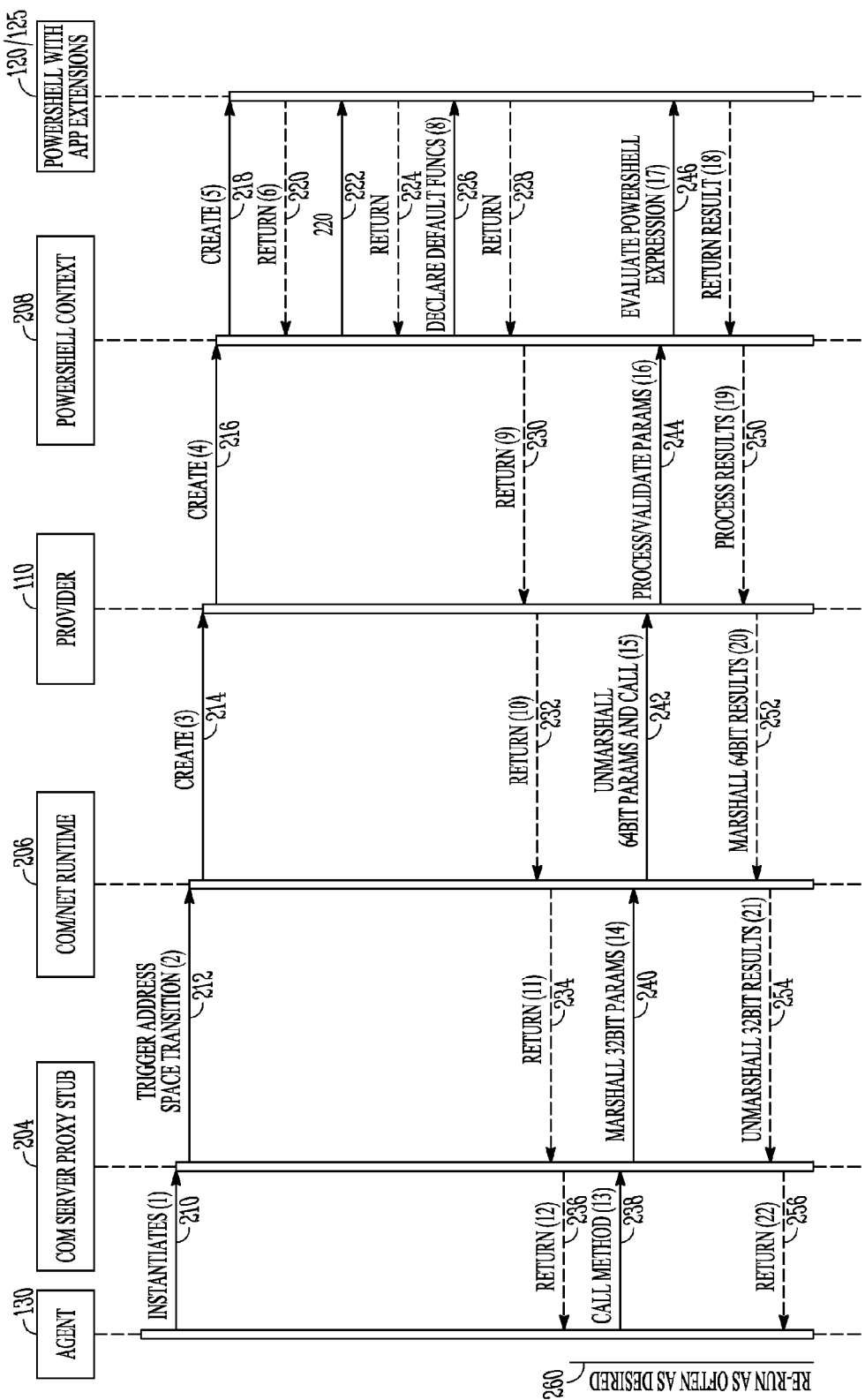
FIG. 2 is a flow diagram illustrating accessing function from different addressing systems according to an example embodiment.

In one embodiment, agent 130 is a 32 bit COM client. In order to access any of the m-bit functionality exposed by the provider 110, the agent 130 creates an instance of the provider using the providers CLSID as indicated at 210 in FIG. 2, which is a flow diagram illustrating accessing interactions between agent 130, provider 110 and application 120 with extensions or functions 125. Time is represented in the vertical direction in FIG. 2.

Initially a global provider object 204 is created that remains alive for the lifetime of the agent 130 application. For thread-safety and improved error handling the agent 130 instantiates short lived provider objects whenever it needs to access m-bit functionality.

Since provider 110 in one embodiment is an out of proc COM server, the instance obtained by the agent 130 application is just a proxy object that interacts with the COM runtime services 206. Proxy object 204 may be referred to as a COM server proxy stub.

When the agent 130 instantiates the global provider object, the COM runtime creates a running instance of the provider 110 application in m-bit mode as indicated at 212, 214. Launching the provider 110 application can be a time consuming operation and the global provider object in the agent 130 is kept alive for the lifetime of the agent 130 application to prevent the provider application to go down requiring frequent re-launches. Any short lived provider objects the agent might instantiate are serviced by the process that is started by the COM runtime when the global provider is instantiated by the agent so creating a short lived provider object involves little overhead.

On instantiation the provider performs initializations to be ready to execute requests from the agent. In particular an invoker object is created at 216 that is used for executing the m-bit application expressions later on (244, 246). The invoker object exists for the lifetime of the provider object and handles repeated execution of m-bit application expressions.

Even though the user interface of m-bit application is a console based text application, m-bit application does not manipulate text like traditional shells do but rather works on objects that live in the Microsoft®.NET Framework. For performance reasons and improved error handling traditional text based shell processing is not used in one embodiment (redirection, text file parsing) but .NET objects are directly manipulated. Therefore the invoker object creates a so called run-space that represents a m-bit application object context 208 with application specific extensions. The run-space is kept alive during the lifetime of the invoker object and thus the provider object.

The invoker object initializes the runspace with some common definitions that are frequently referred to in the upcoming method calls (222, 226). Returns are indicated at 220 and 224. The common definitions may be variables like for example the name of the local computer:

$HostName=$([System.Net.Dns]::GetHostName())

Alternatively, utility functions consisting of m-bit application code that can be called later from the service methods of the provider 110 preventing code duplication and improving maintainability.

After these initializations all calls return (228, 230, 232, 234, 236) and the agent has obtained an initialized provider proxy object 204. Through this object the agent can now call any service methods the provider exposes thereby accessing m-bit functionality that is otherwise not available.

To invoke an m-bit provider method, the agent calls the corresponding method on the provider proxy object 204 it has obtained at 238. Three different types service methods may be implemented by provider 110 in various embodiments.

A first service method is referred to as a simple method. Simple methods are declared with zero or more formal parameters that are passed by value on invocation. Simple methods may or may not return a result.

Complex methods may be declared with zero or more formal parameters that are passed by value and one or more formal parameters that are passed by reference on invocation. Complex methods may be utilized when several pieces of information are being retrieved from m-bit mode through just one method invocation. Although the information could be retrieved by multiple simple method call, this would involve multiple transitions between n and m-bit mode which are performance intense. Utilizing complex methods reduces the number of n/m-bit transitions and thus is a means of performance optimization. Complex methods typically return a result as well.

Simple and complex methods may have m-bit application code embedded that is evaluated during method execution at 246. They are "pre-wired" for the functionality they implement. In a third method, generic methods allow the agent to pass raw application code directly from n-bit mode for evaluation in the m-bit application with application extensions context 120, 125 and may receive back a result of a specific data type. In one embodiment, such code may be commands represented in script code. Generic methods allow extensions of the m-bit related agent functionality without updating the provider. Generic methods can also be used to execute user defined m-bit application scripts through the provider when a certain condition in the agent occurs (e.g. agent monitors storage fragmentation. User configures the agent to treat 80% storage fragementation as critical and defines a m-bit application script to take the storage offline and defragment it as action. Once the fragmentation goes critical the agent retrieves the user script and without any knowledge of its content it passes it through a generic method to the provider where it triggers the desired action in m-bit mode).

Regardless of the method type the call in the agent on the provider proxy object will go into the COM runtime and any parameters passed to the method will be marshaled from n-bit to m-bit mode at 240 and 242. The COM runtime invokes the desired service method on a specific instance of a provider object created earlier (214, 216, 218, 220, 222, 224, 226, 228, 230, 232) in the provider 110 application through the .NET Framework. The method receives the marshaled parameters and builds an m-bit application expression which might be just a single cmdlet invocation or a more complex m-bit application script out of the parameters at 244. This m-bit application expression is then passed to the invoker which runs it through the m-bit application with application extensions context 208. Executing the expression normally returns a .NET object or a collection of .NET objects. If any error occurs an exception is thrown from the m-bit application context which will be caught by the invoker and be translated into an empty result.

The service method of the provider object processes the result of the m-bit application invocation 250 and returns the requested information back to the caller. Depending on the method type the result value and/or the content of actual parameters passed by reference is marshaled from m to n-bit mode by the COM runtime 252. In n-bit mode the results are unmarshaled 254, initial method invocation 238 returns 256 and the n-bit agent 130 has received the desired information from m-bit mode.

The provider proxy object 204 inside the agent 130 can handle any number of method invocations as indicated at 260 during its lifetime.

Figure 3:
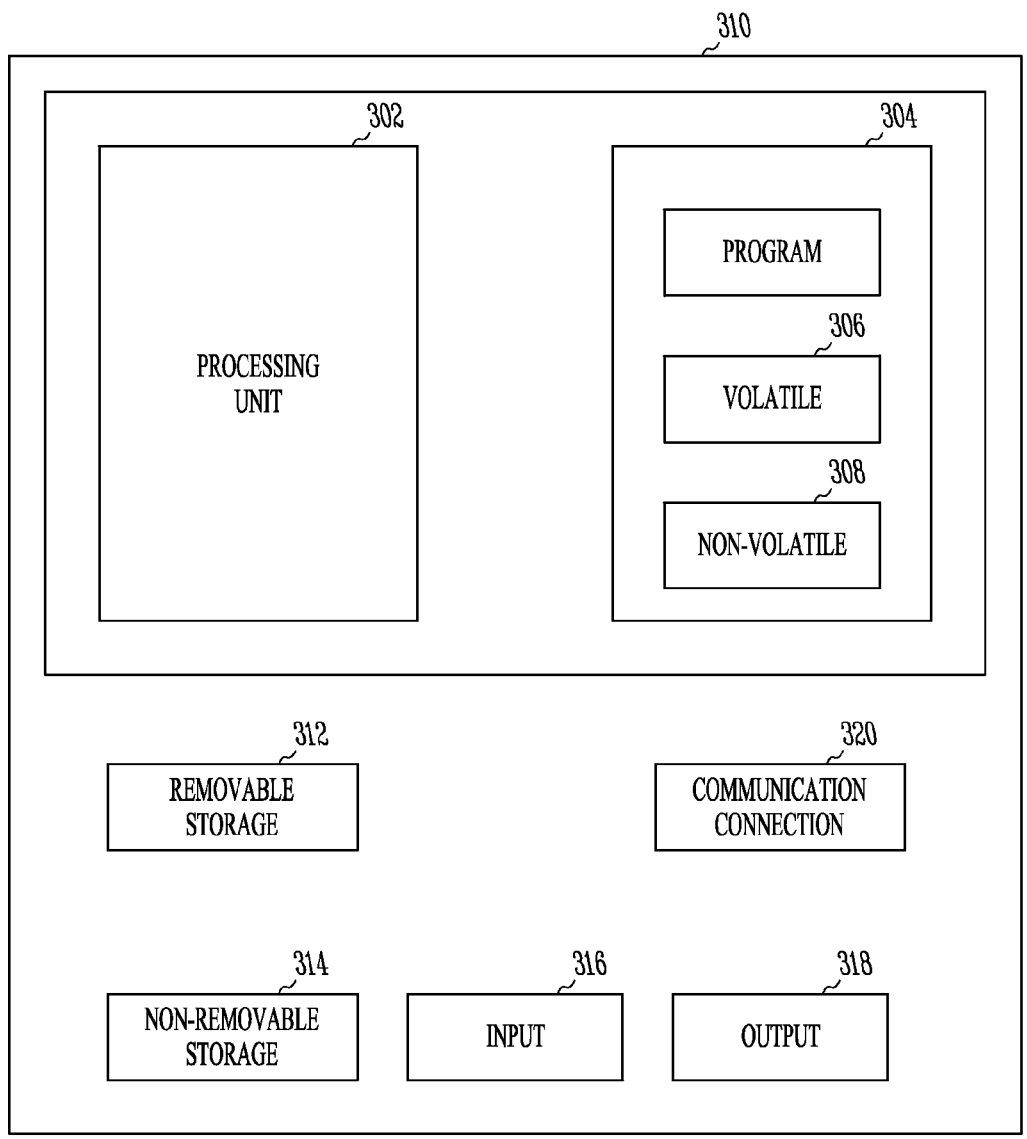
FIG. 3 is a block diagram of an example computer system for performing functions according to an example embodiment.

A block diagram of one or more example computer systems that execute programming for performing the above methods is shown in FIG. 3. A general computing device in the form of a computer 310, may include a processing unit 302, memory 304, removable storage 312, and non-removable storage 314. Memory 304 may include volatile memory 306 and non-volatile memory 308. Computer 310 may include—or have access to a computing environment that includes—a variety of computer-readable media, such as volatile memory 306 and non-volatile memory 308, removable storage 312 and non-removable storage 314. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 310 may include or have access to a computing environment that includes input 316, output 318, and a communication connection 320. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 302 of the computer 310. A hard drive, CD-ROM, and RAM are some examples of articles including a computer-readable medium.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A method of accessing functions, the method comprising:

running in an n-bit supporting environment, n-bit based code, wherein the n-bit supporting environment includes at least one processor;

instantiating an n-bit proxy object in an application running the n-bit based code;

instantiating an m-bit based provider object in an m-bit hardware and operating system environment server, wherein the provider object provides an interface between the n-bit based code and m-bit based server functions, and wherein the provider object includes m-bit based functions application programming interfaces exposed as component object model interfaces;

accessing, via the n-bit proxy object, the m-bit based provider object;

creating an invoker object for executing m-bit application expressions, the invoker object configured to create a runspace that represents m-bit application object context with application specific extensions; and passing the m-bit based code as raw code to the m-bit based provider object to access m-bit based server functions from the n-bit supporting environment through the m-bit based provider object and the invoker object through a generic method call, wherein n is either 32 or 64 and m is either 32 or 64, and n does not equal m.

2. The method of claim 1 wherein the provider object is implemented using dynamic link library surrogation.

3. The method of claim 2 wherein the dynamic link library surrogation is implemented by using a default dynamic link library surrogation host provided by the m-bit system or a custom dynamic link library surrogation host.

4. The method of claim 3 wherein n is 32 and m is 64.

5. The method of claim 4 wherein m-bit based server functions are accessed by the n-bit based code via the m-bit based provider object via the generic method call with m-bit embedded code passed on invocation.

6. The method of claim 1 wherein the provider object is implemented as a standalone m-bit application using a local component object model out of process server.

7. The method of claim 1 wherein the functions comprise application services.

8. The method of claim 1 wherein m-bit based server functions are accessed by the n-bit based code via the m-bit based provider object via a simple method call with zero or more parameters passed by value on invocation.

9. The method of claim 1 wherein m-bit based server functions are accessed by the n-bit based code via the m-bit based provider object via a complex method call with zero or more parameters passed by value on invocation to access multiple pieces of information.

10. A system comprising:

an n-bit supporting environment configured to run n-bit based code, wherein the n-bit supporting environment includes at least one processor;

an m-bit based provider object that is configured to run in an m-bit environment and exposes m-bit functionality of an m-bit application through m-bit based application programming interfaces to m-bit functions, wherein m is either 32 or 64;

wherein the m-bit environment includes at least one processor;

an n-bit proxy object configured to be instantiated in an application running the n-bit based code and wherein the m-bit based provider object is accessed via the n-bit proxy object;

an invoker object configured to execute m-bit application expressions and create a runspace that represents m-bit application object context with application specific extensions; and wherein the m-bit based provider object includes the m-bit based application programming interfaces and exposes the m-bit based application programming interfaces to n-bit based agents via component object model interfaces, such that the n-bit based agents pass m-bit based raw application code to the m-bit based provider object to access m-bit functions through the m-bit based provider object and the invoker object through a generic method call, wherein n is either 32 or 64, and n does not equal m.

11. The system of claim 10 wherein the m-bit functions comprise management and configuration interfaces.

12. The system of claim 10 wherein n is 32 and m is 64.

13. A non-transitory storage device having instructions for causing a computer to implement a method of accessing functions, the method comprising:
running in an n-bit supporting environment, n-bit based code, wherein the n-bit supporting environment includes at least one processor;
instantiating an n-bit proxy object in an application running the n-bit based code;
instantiating an m-bit based provider object in an m-bit hardware and operating system environment server, wherein the m-bit operating system environment server includes at least one processor, and wherein the provider object provides an interface between the n-bit based code and m-bit based server functions, and wherein the provider object includes m-bit based function application programming interfaces exposed as component object model interfaces, wherein n is either 32 or 64 and m is either 32 or 64, and m does not equal n;
accessing, via the n-bit proxy object, the m-bit based provider object;
creating an invoker object for executing m-bit application expressions, the invoker object configured to create a runspace that represents m-bit application object context with application specific extensions;
receiving, at the m-bit based provider object, n-bit based method calls from an n-bit based agent; and
passing m-bit based raw application code to the m-bit based provider object to access the m-bit based server functions from the n-bit based agent through the m-bit based provider object and the invoker object through a generic method call.

14. The storage device of claim 13 wherein the received n-bit based method calls relate to m-bit based functions related to managing, monitoring and configuring an n-bit based application.

15. The storage device of claim 13 wherein the provider object is implemented using dynamic link library surrogation, a default dynamic link library surrogation host provided by the m-bit system or a custom dynamic link library surrogation host.

16. The storage device of claim 13 wherein the n-bit method call comprises a simple method call with zero or more parameters passed by value on invocation, a complex method call with zero or more parameters passed by value on invocation to access multiple pieces of information, or a generic method call with m-bit embedded code passed on invocation.

17. A method of accessing functions, the method comprising:
running in an n-bit supporting environment, n-bit based code, wherein the n-bit supporting environment includes at least one processor;
instantiating an n-bit proxy object in an application running the n-bit based code, wherein n is either 32 or 64;
instantiating an m-bit based provider object in an m-bit hardware and operating system environment server, wherein the m-bit operating system environment server includes at least one processor, and wherein the provider object provides an interface between the n-bit based code and m-bit based service methods and wherein the provider object includes m-bit based function application programming interfaces exposed as component object model interfaces;
accessing, via the n-bit proxy object, the m-bit based provider object;
creating an invoker object for executing m-bit application expressions, the invoker object configured to create a runspace that represents m-bit application object context with application specific extensions;
passing m-bit based raw application code to the m-bit based provider object to access the m-bit based service methods from the n-bit proxy object through the m-bit based provider object and the invoker object through a generic method call; and
receiving results from the m-bit based service methods via the m-bit based provider object, including:
marshaling, using a component object model runtime library, n-bit parameters and an n-bit request passed to the m-bit operating system environment server to m-bit,
invoking an m-bit based service method of the m-bit based service methods,
passing the marshaled parameters to the m-bit based service method,
marshaling, using the component object model runtime library, an m-bit result of the service method from m-bit to n-bit, and
returning the n-bit result from the provider object, and wherein me is either 32 or 64, and m does not equal n.

* * * * *